No. 629,837. Patented Aug. 1, 1899.
A. H. WHITING.
MOTOR CONTROL.
(Application filed Sept. 27, 1898.)
(No Model.) 2 Sheets—Sheet 1.
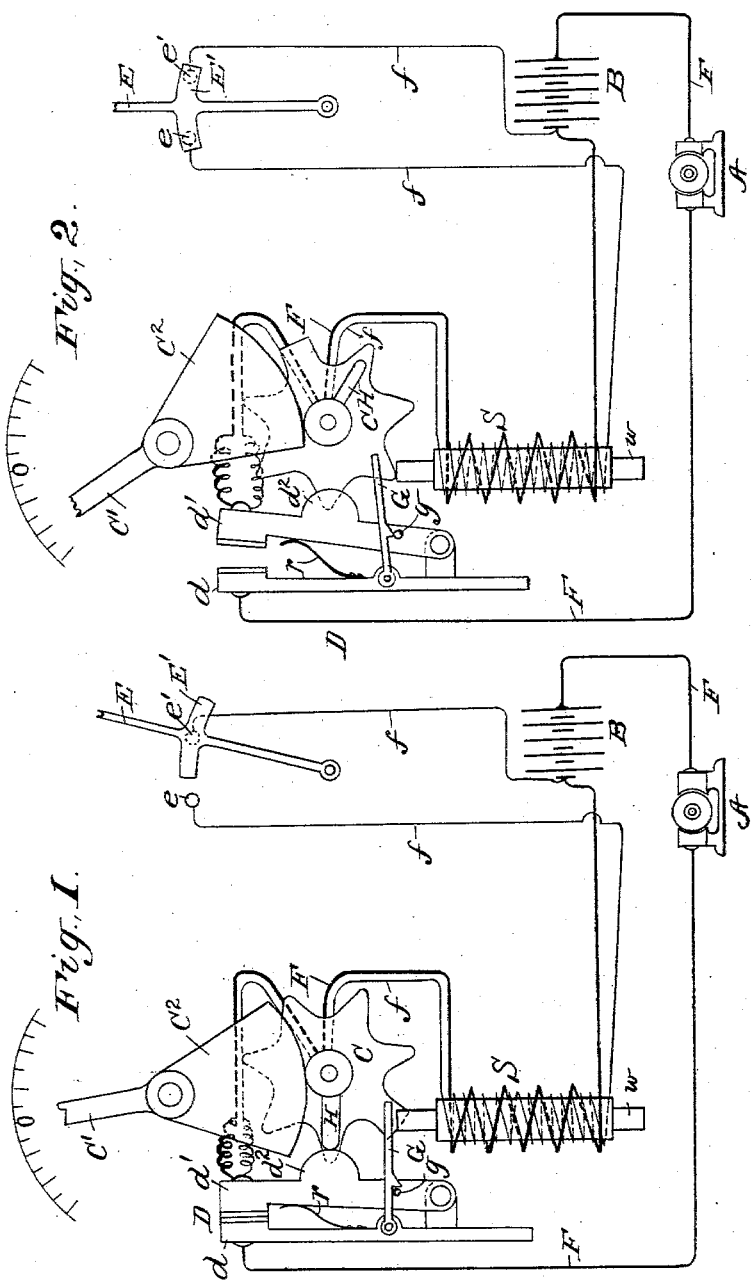

No. 629,837. Patented Aug. 1, 1899.
A. H. WHITING.
MOTOR CONTROL.
(Application filed Sept. 27, 1898.)
(No Model.) 2 Sheets—Sheet 2.
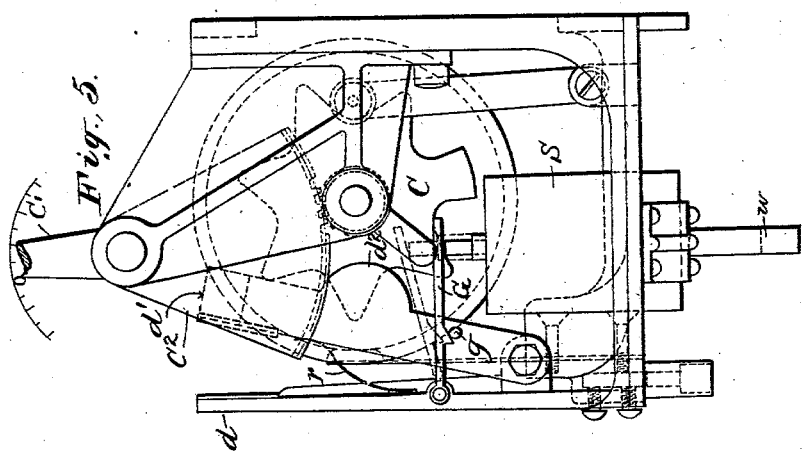
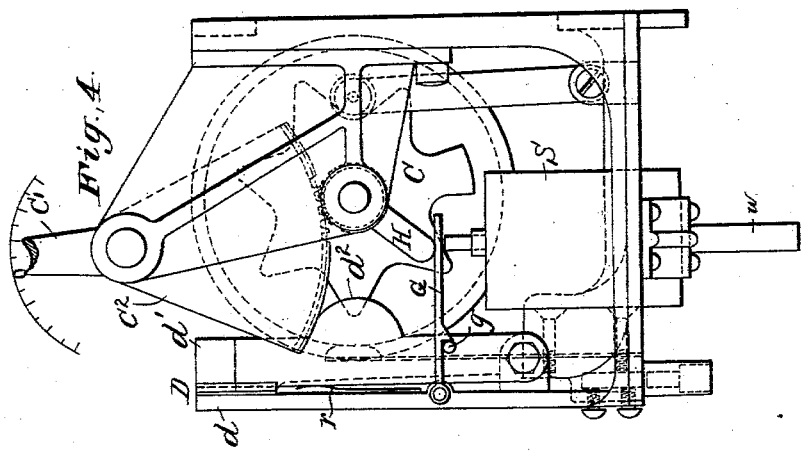
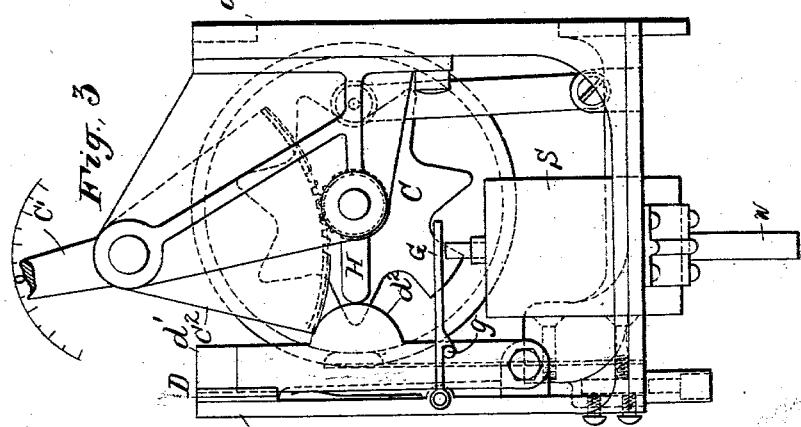

UNITED STATES PATENT OFFICE.

ALLAN H. WHITING, OF NEW YORK, N. Y., ASSIGNOR TO ANDREW L. RIKER, OF SAME PLACE.

MOTOR CONTROL.

SPECIFICATION forming part of Letters Patent No. 629,837, dated August 1, 1899.

Application filed September 27, 1898. Serial No. 692,040. (No model.)

*To all whom it may concern:*

Be it known that I, ALLAN H. WHITING, of New York, State of New York, have invented a new and useful Improvement in Motor Control, which improvement is fully set forth in the following specification.

My invention relates to motors and the supply and control of power therefor.

In the operation of various classes of motors it is frequently found necessary or desirable to quickly stop the motor or the mechanism driven thereby, or both, by the application of suitable brake devices. At such times the source of power should be cut off from the motor immediately, but through the carelessness or excitement of the operator this is liable to be omitted, with resultant damage to the motor and the driven mechanism. In a like manner great damage is liable to result from overloading the motor—as, for example, when the wheels of a motocycle become stuck in the mud or when a serious obstruction is encountered by any of the moving parts. In case the power has through any agency been cut off from the motor considerations of safety for the operator and the machinery render it imperative that when the power is again admitted to the motor it should not be at its full maximum strength, but should be gradually increased from the zero or minimum point until any desired rate of speed for the motor is secured.

One object of my invention is to avoid the difficulties due to overloading of the motor or the failure of the operator to cut off the motive power from the motor on the application of the brakes; and a further object is to render it impossible when power has been cut off to resupply the motor with power except by commencing at the zero or minimum point and increasing until the desired motive power has been reached.

With these objects in view my invention consists in means whereby power will be automatically cut off from the motor when the brake is applied or the motor is overloaded and in the combination of said automatically-operated cut-off means with devices whereby power may be restored to the motor only by commencing at the zero or minimum point and increasing as may be desired.

For purpose of convenient illustration I have shown my invention in connection with an electric motor and lever brake mechanism; but it will be understood that the invention is not limited to any particular class of motors nor to any special form of mechanism operated thereby.

In the drawings forming a part of this specification, Figures 1 and 2 are diagrammatic views showing the parts in different positions which they may assume. Fig. 3 is a side elevation of the controller and cut-off switch with the controller in position to close the switch and at the same time cut off the current. Fig. 4 shows the switch closed and the controller in position to turn on the current, and Fig. 5 shows the switch open and the controller in position to leave the current on.

Like letters refer to like parts in all the views.

Referring to Figs. 1 and 2, A indicates an electric motor, and B a source of electricity, as a battery, for supplying power thereto.

C is a controller regulating the supply of current to the motor, C' the controller-lever, and D is a switch in the circuit F, said switch having the stationary jaw or member $d$ and the pivoted or otherwise-movable member $d'$. The switch is held closed against the tension of the spring $r$ by the latch G engaging the latch-pin $g$ on the pivoted member $d'$.

S is a solenoid, the heavy wire of the main circuit F making a limited number of turns around the core $w$ thereof and thence to the battery B. The course of this main circuit is from the battery B, the motor A, the switch D, the controller C, and around the solenoid S to the battery.

Connected to the movable member $d'$ of the switch D is a fine wire $f$, which passes with a large number of coils around the solenoid-core $w$, and thence to a contact-point $e$ and from a second contact $e'$ to the battery.

E is a pivoted brake-lever having connected thereto, but insulated therefrom, a metallic contact-plate E', wiping across the two contact-points $e\ e'$ when the brake-lever is in position to apply a brake, (see Fig. 2,) but normally occupying a position in contact with but one of said points, as shown in Fig. 1.

H is a lug or arm on the controller C, and $d^2$ is a cam projection on the movable part $d'$ of the switch D, the relative positions and proportions of the arm and cam being such that the arm H by impinging on the cam $d^2$ when the controller is rotated closes the switch against the spring $r$ and permits the catch G to drop over the latch-pin $g$.

In the position of the parts shown in Fig. 1 the switch D is closed, so that current may pass therethrough over the line F; but the parts are so arranged that when the arm H wipes the cam $d^2$, as in Figs. 1 and 3, the controller C occupies a position which completely shuts off current—that is, it is at the zero-point. In the position of the parts shown in Fig. 2 the controller is in position to allow a strong current to pass therethrough, but the switch D is open. In neither case can power reach the motor.

Referring now to Figs. 3, 4, and 5, it will be seen that in the position shown in Fig. 3 the switch is closed, but the controller is at the zero position. In Fig. 4 the controller has been turned from the zero position, and the switch D being closed the circuit through the main line F is complete from the battery to the motor. The core $w$ of the solenoid is so weighted that the normal current passing over the line F and around the solenoid just serves to balance the core. If now the motor should be overloaded from any cause the consequent excess of current from the battery passing over the main line F would advance the core $w$ of the solenoid and lift the latch G, as shown in dotted lines in Fig. 5, permitting the switch-arm $d'$ to fly open under the stress of the spring $r$, whereupon the circuit being opened the solenoid-core $w$ and the latch G would drop back to the position shown in full lines in Fig. 5. In this position of the parts the controller C is in position to permit current to pass to the motor if the switch D were closed; but to close the switch D the controller must be turned to the position shown in Fig. 3—that is, to the zero-point—and after the switch is closed the controller may then be returned to admit current to the motor, as shown in Fig. 4. It will thus be seen that if the switch D is open it is necessary before it can be closed to turn the controller to the zero position, so that when the switch is closed again no current can reach the motor till the controller is operated for that purpose. Assuming that the switch D is closed and the controller in position to admit current to the motor, as in Fig. 4, and the brake E to be in the position shown in Fig. 1, the current passing over the main line F to operate the motor would hold the core $w$ of the solenoid balanced, and no current passes over the fine wire $f$. If now this brake-lever E be moved from the position shown in Fig. 1 to that of Fig. 2, the contact-plate E' wipes over both contact-points $e\ e'$, and a portion of the current on the main wire F will pass to the battery over the fine wire $f$; but this current by reason of the fact that the fine wire has many more coils around the solenoid than the wire F will act to advance the core $w$ and lift the latch G, as shown in dotted lines, Fig. 5, and permit the switch D to open. The parts would then occupy the position shown in Fig. 2, it being understood, of course, that the exact position of the controller is immaterial, except that it is turned to admit current to the motor. If now the brake-lever E and the contact-plate E' be permitted to return to the position shown in Fig. 1, the other parts will remain as in Fig. 2, with the switch D open and the controller in position to permit current to pass. Before, however, the switch D can be closed it is necessary to turn the controller C back to the zero position, upon which the arm H strikes the cam $d^2$ and closes the switch, as shown in Fig. 1. It will thus be seen that upon the imposition of an overload or the throwing of a brake-lever the switch D is opened, cutting off the current from the motor, and that in either case the controller must be returned to the zero position in resetting or closing the switch D, thereby rendering it impossible to so close the switch as to suddenly readmit a heavy current to the motor, with its attendant ill effects.

I have shown the cut-off which acts upon the imposition of an overload or the throw of the brake-lever as the switch D; but manifestly the form of cut-off may vary with the form of motor employed. I have also indicated the controller by the star C, it being also wholly immaterial what form the controller may assume, the essential feature being that some form of cut-off operates with some form of controller, the two being so arranged with relation to each other that the cut-off is restored to its operative position only by throwing the controller to the zero or minimum-power-supply position.

What I claim is—

1. The combination of a motor, and means for supplying power thereto, with a brake-lever operated independent of said motor and automatic power-cut-off mechanism for said motor operated by the brake-lever upon the application of a brake, substantially as described.

2. The combination of an electric motor, and means for supplying current thereto, with a brake-lever operated independent of said motor and an automatic cut-off device for said motor operated by the brake-lever upon the application of the brake, substantially as described.

3. A motor, a power-supply therefor, a cut-off normally admitting power to the motor but automatically cutting off the power upon the application of a brake, a controller independent of said cut-off and regulating the supply of power to the motor, and means on the controller engaging said cut-off and restoring the latter to its normal position, substantially as described.

4. A motor, a power-supply therefor, a cut-off normally admitting power to the motor but automatically cutting off the power upon the application of a brake, a controller independent of said cut-off and regulating the supply of power to the motor, and means on the controller engaging said cut-off and restoring the latter to its normal position only when the controller is in the position of zero or minimum-power supply, substantially as described.

5. The combination of an electric motor, a current-supply therefor, a switch in the supply-circuit, means tending to open said switch, restraining devices normally holding the switch closed, and means releasing said switch and permitting it to open upon the application of a brake, substantially as described.

6. The combination of an electric motor, a current-supply therefor, a switch in the supply-circuit normally held closed against spring tension by a latch, a solenoid having coils forming a part of the supply-circuit, a core in the solenoid in proximity to said latch, said core being balanced by the passage of the normal working current but advancing to lift said latch upon the passage of an increased current, substantially as described.

7. The combination of an electric motor, a brake-lever, a current-supply, a controller therefor, a normally-closed switch in the supply-circuit, automatic means for opening said switch upon the throw of the brake-lever, and means automatically operated solely by the controller to close said switch, substantially as described.

8. The combination of an electric motor, a brake-lever, a current-supply, a controller therefor, a normally-closed switch in the supply-circuit, automatic means for opening said switch upon the throw of the brake-lever, and means automatically operated by the controller to close said switch only when the former is in the position of zero or minimum-current supply, substantially as described.

9. The combination of an electric motor, a current-supply, a controller therefor, a switch in the supply-circuit normally held closed against spring tension by a latch, a solenoid with coils forming a part of the current-supply circuit, a core in the solenoid and in proximity to the switch-latch, said core being weighted so as to be balanced by the normal working current, a light wire connected to one member of the switch and passing in coils around the solenoid and thence to the latter, a break in said fine wire, and a switch closing said break upon the turn of a brake-lever, substantially as described.

10. The combination of an electric motor, a main circuit therefor, an automatic electromagnetically-controlled switch in said circuit, said switch operating to open the circuit upon the application of a brake, a controller in said circuit connected with said switch and operating to close the same only when the controller is in the zero or normal position, substantially as described.

In testimony whereof I have signed this specification in the presence of two subscribing witnesses.

ALLAN H. WHITING.

Witnesses:
   A. L. RIKER,
   A. C. SCHULZ.